United States Patent [19]

Wheland

[11] Patent Number: 5,021,516

[45] Date of Patent: Jun. 4, 1991

[54] POLY(PERFLUOROETHER)ACYL PEROXIDES

[75] Inventor: Robert C. Wheland, Wilmington, Del.

[73] Assignee: E. I. Du Pont de Nemours and Company, Wilmington, Del.

[21] Appl. No.: 371,138

[22] Filed: Jun. 26, 1989

[51] Int. Cl.⁵ .................. C08G 65/22; C08G 65/26; C08G 65/32
[52] U.S. Cl. .................. 525/403; 525/473; 568/560
[58] Field of Search .............. 525/403, 473; 568/560

[56] References Cited

U.S. PATENT DOCUMENTS

| | | | |
|---|---|---|---|
| 2,559,630 | 7/1951 | Bullitt | 260/610 |
| 2,792,423 | 5/1957 | Young et al. | 260/610 |
| 3,810,875 | 5/1974 | Rice et al. | 260/899 |
| 3,847,978 | 11/1974 | Sianesi et al. | 568/560 X |
| 3,882,193 | 5/1975 | Rice et al. | 260/874 |
| 4,654,444 | 3/1987 | Oka et al. | 568/560 |

OTHER PUBLICATIONS

Chengxue et al., *J. Org. Chem.*, 47, pp. 2009–2013 (1982).

*Primary Examiner*—Earl Neilsen

[57] ABSTRACT

This invention concerns novel polymeric perfluoroether acyl peroxides and an improved process for making them.

20 Claims, No Drawings

POLY(PERFLUOROETHER)ACYL PEROXIDES

BACKGROUND OF THE INVENTION

1. Field of the Invention

This invention concerns polymeric perfluoroetheracyl peroxides, and an improved process for making them.

Selected high molecular weight fluorocarbon and perfluoroether peroxides have been known in the art for a number of years. The synthesis of these compounds has generally involved the reaction of aqueous peroxide with an acid halide. Using this method, some of the acid halide is converted to carboxylate salt. As the molecular weight of the carboxylate salt increases, soaps and stiff emulsified gels are formed that interfere with the isolation of the pure compound. Conventional methods of isolating the peroxide have involved treatment of the mixture with sulfuric acid and following up the procedure with centrifugation to separate out the peroxide. See, e.g., U.S. Pat. No. 3,882,193. The present invention improves upon prior art procedures for synthesizing oligomeric peroxides by limiting the presence of water so as to retard emulsion and gel formation and result in the direct formation of a liquid product containing the high molecular weight perfluoroether peroxides. This invention also concerns novel polymeric peroxides produced by the present process, and a novel method of coating substrates with fluoropolymers using the polymeric peroxides.

2. Discussion of the Prior Art

U.S. Pat. Nos. 2,559,630 and 2,792,423 disclose polymeric perfluoroalkylacyl peroxides and a method for making them. The chemistry used in the process to produce the acyl peroxides is the reaction of the corresponding acyl halide (usually fluoride or chloride) with a peroxide under basic conditions. The peroxide can be added as hydrogen peroxide and a base such as sodium hydroxide added, or the base and peroxide can be combined in one compound such as sodium peroxide. The reaction is often done in a heterogeneous system containing water to dissolve the inorganic salts, and an organic solvent to dissolve the perfluoro polymer.

U.S. Pat. Nos. 3,810,875 and 3,882,193 disclose polymeric perfluoroether acyl peroxides wherein both ends of the perfluoroether polymers end in peroxides, and each "block" of perfluoroether polymer is part of a larger polymer molecule joined by peroxide linkages. Thus, such poly(perfluoroether)acyl peroxides are "difunctional", that is reactive on both ends of the perfluoroether blocks. The same basic chemistry described above was used to prepare the peroxides.

Z. Chengxue et al., in Journal of Organic Chemistry, vol. 1982, pages 2009-2013 describe the decomposition of perfluoroacyl peroxides for both perfluorocarbon and perfluoroether compounds, but the molecular weights of the perfluoro segments are very low.

SUMMARY OF THE INVENTION

A poly(perfluoroether)acyl peroxide of the formula

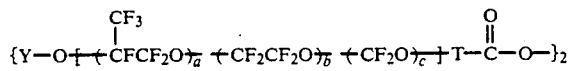

wherein

Y is a perfluoroalkyl group containing up to 12 carbon atoms, a+b+c is a minimum of 2 and a maximum such that the maximum molecular weight of the peroxide is about 33,000; and T is —CF$_2$— and —CF(CF$_3$)—, provided that when a is zero, T is not —CF(CF$_3$)—, when b is zero T is not —CF$_2$—, and further provided that when a and b are both zero, T is —CF$_2$—.

Also provided is an improved process for the preparation of such peroxides from the corresponding poly(perfluoroether)acyl halide, peroxide and base, the improvement consisting of using a specified amount of water in the reaction. The molar ratio of water/peroxide (starting material) present in the reaction ranges from about 0.2 to about 10. An optional improvement consists of passing the reaction mixture at the conclusion of the reaction through a solid desiccant to remove liquid water.

Also provided is a process for the coating of substrates with fluoropolymers using such peroxides as the initiators. The peroxide is coated on the substrate, as by evaporation of a solution of the peroxide on the substrate, and then the peroxide coated substrate is exposed to fluorine containing monomers capable of being polymerized by free radicals, at a temperature at which the peroxide decomposes.

DETAILS OF THE INVENTION

It is known that poly(perfluoroethers) tend to be liquids, and it is the object of this invention to provide liquid, easily used, poly(perfluoroether)acyl peroxides that can be used, for example, to place relatively large poly(perfluoroether) groups (blocks) on the ends of free radical polymerized polymers.

Poly(perfluoroether)acyl peroxides are commonly made by reacting a poly(perfluoroether)acyl halide, usually the fluoride or chloride, with an inorganic peroxide in the presence of base. This is usually done in the presence of water, to dissolve the inorganic reagents, and an organic solvent, to dissolve the poly(perfluoroether)acyl halide. An inevitable consequence of this reaction is the production of at least small amounts of poly(perfluoroether) carboxylate. When the perfluoroether chain is of substantial length, this acts as a surfactant, causing the formation of virtually intractable emulsions and suspensions, which greatly complicates isolation of the peroxide and reduces the yield obtained. It is a further objective of this invention to provide a process for making such peroxides.

The poly(perfluoroether)acyl peroxides of this invention have the formula

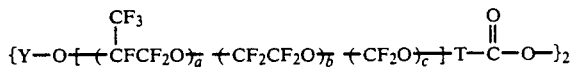

wherein

Y is a perfluoroalkyl group containing up to 12 carbon atoms, a+b+c is a minimum of 2 and a maximum such that the maximum molecular weight of the peroxide is about 33,000; and T is —CF$_2$— and —CF(CF$_3$)—, provided that when a is zero, T is not —CF(CF$_3$)—, when b is zero T is not —CF$_2$—, and further provided that when a and b are both zero, T is —CF$_2$—.

It is understood that within the bracketed term "[ ]", if more than one monomer is used, the polymer may be a random copolymer or a block copolymer; if it is a block copolymer, then T will be a fragment of the last monomer used. This is also true for the poly(perfluoroether)acyl halide precursor (infra).

Y is an end group derived from the species that initiated the polymerization of the perfluoroether. Most typically, and preferred, it is $CF_3-$ when carbonyl fluoride ($COF_2$) is the monomer (repeat unit), $CF_3CF_2-$ when tetrafluoroethylene oxide is the monomer (repeat unit), and $CF_3CF_2CF_2-$ when hexafluoropropylene oxide is the monomer (repeat unit). In a random copolymer containing 2 or more of these monomers, the end group is derived from any of the monomers used.

It is preferred that a+b+c is a minimum of 2 and a maximum such that the molecular weight of the peroxide does not exceed 16,500, and most preferred that a+b+c is a minimum of 5 and a maximum such that the molecular weight of the peroxide does not exceed 11,000. In all of the formulas in this application a, b and c represent the average number of monomer units in the molecule—since the poly(perfluoroether)acyl halides are made by polymerization, they have a molecular weight distribution.

Peroxides of this formula can be prepared by reacting a poly(perfluoroether)acyl halide with a peroxide and a base. The poly(perfluoroether)acyl halide is of the formula

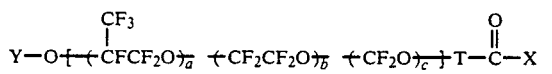

wherein

Y is a perfluoroalkyl group containing up to 12 carbon atoms, a+b+c is a minimum of 2 and a maximum such that the maximum molecular weight of the acyl halide is about 16,500;

X is chlorine or fluorine; and

T is $-CF_2-$ and $-CF(CF_3)-$, provided that when a is zero, T is not $-CF(CF_3)-$, when b is zero T is not $-CF_2-$, and further provided that when a and b are both zero, T is $-CF_2-$.

Compounds of this type are well known to those skilled in the art, for example, U.S. Pat. Nos. 3,250,807 and 3,347,901 and J. T. Hill, Journal of Macromolecular Science, Chemistry, vol. A8, pages 499-520 (1974).

The base may be an alkali or alkaline earth metal (bi)carbonate or phosphate. Such weakly basic anions as carbonates and bicarbonates are preferred. Any metal selected must provide moderate water solubility. The molar ratio of base to acyl halide should be at least 1.

The hydrogen peroxide may contain 16% to 90% water. Thirty percent hydrogen peroxide is preferred. The ratio of number of moles water/peroxide is about 0.2 to about 10. The preferred ratio is 0.8 to 6. In calculating the ratio of water to peroxide, all water is included whether introduced in the solvent or as aqueous hydrogen peroxide. The number of moles of peroxide (whether as hydrogen peroxide or another form) should be approximately one-half the molar amount of the poly(perfluoroether)acyl halide (stoichiometrically equal).

The process can be carried out in the optional presence of a solvent. Inert fluorocarbon fluids are preferred. Especially preferred is 1,1,2-trichlorotrifluoroethane.

The reaction is carried out within a temperature range chosen so that the aqueous phase will not freeze and the peroxide will not decompose. A preferred range is $-30°$ C. to $40°$ C. The most preferred temperature range is $-15°$ C. to $0°$ C.

The reaction time may vary from about 1 minute to 8 hours. Preferably the reaction time is about 5 to about 60 minutes. High speed stirring, as with a blender, increases yields.

After the reaction is complete, the reaction mixture may optionally be treated with a solid drying agent (desiccant) to remove water. Anhydrous calcium sulfate (commercially available as Drierite ®) is a suitable drying agent. At the same time, it may be convenient to remove insoluble organic salts by filtration, as through glass wool.

The poly(perfluoroether)acyl peroxide may be used as a solution in the solvent in which it was made, or the solvent can be removed (at low temperature, for example by distillation under vacuum) to isolate the peroxide. As in handling peroxides in general, care should be exercised in handling the neat peroxides, especially those of relatively low molecular weight.

These poly(perfluoroether)acyl peroxides are useful as nonvolatile free radical polymerization initiators. They are also useful for preparing free radical polymerized polymers that have a perfluoroether block on one end. Such block polymers are useful for modifying the surface properties of hydrocarbon polymers, as described in European Patent Application 0,161.804.

The poly(perfluoroether)acyl peroxides are also useful for coating solid substrates with fluorocarbon polymers. Such a process comprises:

(1) coating the solid substrate with a poly(perfluoroether)acyl peroxide; and (2) exposing said substrate, coated with said peroxide, to free radical polymerizable fluorocarbon monomers at a temperature at which said peroxide decomposes to form free radicals.

Any convenient method can be used to coat the solid substrate with peroxide, such as dipping into, or brushing or rolling on a solution of the peroxide, and then allowing the solvent to evaporate. Alternatively, the neat peroxide may be brushed or rolled on. Using a solution to do the coating is preferred. Only a minimal amount of peroxide is needed on the solid substrate, since it acts only to initiate the polymerization.

The peroxide coated solid substrate is then exposed to the fluorocarbon monomer at a temperature at which the peroxide decomposes to free radicals, about $10°$ C. to $150°$ C., preferably $40°$ C. to $80°$ C. The fluorocarbon monomer can be gaseous, a neat liquid or dissolved in a solvent. Obviously if another liquid such as neat monomer or a solvent is present, the liquid should not appreciably dissolve the peroxide. The thickness of the coating can be controlled by the ratio of surface area of the solid substrate to the amount of fluorocarbon monomer used (area/amount of monomer). The higher this ratio, the thinner the coating.

Fluorocarbon monomers suitable for the coating process are those which contain at least one fluorine atom and may be polymerized by free radicals; such monomers are well known to those skilled in the art. They include but are not limited to one or more of tetrafluoroethylene, hexafluoropropylene, perfluoro(2,2-dimethyl-1,3-dioxole), perfluoromethyl vinyl ether, perfluoropropyl vinyl ether, vinylidene fluoride, chlorotrifluoroethylene and vinyl fluoride and copolymers thereof. Tetrafluoroethylene is preferred. Small amounts, up to 10 mole percent, of free radical polymerizable nonfluorine containing monomers may also be copolymerized into the fluoropolymer coating.

The substrates to be coated can be porous or nonporous, and include, but are not limited to, fibers, fabrics, paper, metals and ceramics. Preferred substrates are fibers, fabrics and metals. The substrate must be chosen so that the peroxide is stable on the substrate. Some of the transition metals, especially iron, may cause peroxide decomposition and should be avoided.

In the following Examples, these symbols are used:
A(n) is $\{CF_3CF_2CF_2O[CF(CF_3)CF_2O]_nCF(CF_3)C(=O)O-\}_2$
B(n) is $CF_3CF_2CF_2O[CF(CF_3)CF_2O]_nCF(CF_3)C(=O)F$ The number "n" is the average number of units in the molecule, and is rounded off to the nearest integer.

Peroxide Titration

The peroxide titration used in the Examples follows. In a loosely stoppered Erlenmeyer flask several grams of dry ice are added to 25 ml of glacial acetic acid, so as to flush oxygen from the system. Five ml of a solution of 30 g of KI in 70 ml of deoxygenated water is added, and then 5.0 ml of the peroxide solution to be analyzed. The mixture is stirred for 10 minutes to allow the peroxide to react with the iodide. One hundred ml of deoxygenated water is added and the deep iodine color is titrated to light yellow with 0.1N sodium thiosulfate. Then 0.5 g of "Thyodene" (from Fisher Scientific Co.) iodometric indicator is added making the reaction mixture turn blue. Titration is completed by bringing to a colorless endpoint with additional 0.1N sodium thiosulfate. Molar peroxide concentration is 0.01 times the total number of ml of sodium thiosulfate solution.

EXAMPLE 1

Preparation of A(8)

A flask under a positive pressure of nitrogen was loaded with 100 ml of 1,1,2-trichlorotrifluoroethane and 32 g (0.02 mole) of B(8). The mixture was cooled to −5° C. and 2.12 g of finely divided sodium carbonate (0.02 mole) added. Next 1.0 ml of 30% hydrogen peroxide (0.01 mole) was added and the reaction mixture stirred for 3.5 hours at −5° C. under a positive pressure of nitrogen. The reaction mxiture was passed cold through 20 g of Drierite ® (anhydrous CaSO$_4$ desiccant produced by W. A. Hammond, Drierite Company), 8 mesh, in a chromatography column which contained a plug of glass wool in the bottom. Addition of 5.0 ml of the reaction mixture to potassium iodide in acetic acid/water and titration with sodium thiosulfate indicated 0.088M peroxide. With no volatile solvent loss and 100% yield, a peroxide concentration of 0.083M would have been expected.

EXAMPLE 2

Preparation of A(60)

A flask under a positive pressure of nitrogen was loaded with 50 ml of 1,1,2-trichlorotrifluoroethane and 102 g of B(60) (0.005 mole). The mixture was cooled to −5° C and then 3.26 g of finely divided cesium carbonate (0.01 mole) and 0.50 ml of 30% hydrogen peroxide (0.005 mole) were added. The mixture was stirred for 7 hours at 0° C. and then washed through 25 g of Drierite ® with an additional 50 ml of 1,1,2-trichlorotrifluoroethane. This mixture was stored in a −15° C. refrigerator where layer separation occurred. The upper layer titrated for no peroxide whereas the lower layer titrated for 0.008M peroxide. Pure peroxide of 20,000 M. W. and density of 1.9 g/ml would be expected to titrate for 0.095M peroxide.

EXAMPLE 3

Preparation of A(19)

A flask under a positive pressure of nitrogen was loaded with 50 ml of 1,1,2-trichlorotrifluoroethane and 34 g of B(19) (0.01 mole). The mixture was cooled to −5° C. and then 1.06 g of finely divided sodium carbonate (0.01 mole) and 0.50 ml of 30% hydrogen peroxide (0.005 mole) were added. The mixture was stirred for 30 minutes at −5° C. and then filtered through 50 g of Drierite ® into a polyethylene bottle. Peroxide content by titration was 0.05M. With no volatile solvent loss and 100% yield, a peroxide concentration of about 0.074M would have been expected.

EXAMPLE 4

Preparation of A(21)

A Waring blender swept with nitrogen and cooled in wet ice was loaded with 200 ml of 1,1,2-trichlorotrifluoroethane, 36.9 g of B(21) (0.01 mole), and 1.05 g of powdered sodium carbonate (0.01 mole). The reaction was stirred briefly and then 0.5 ml of 30% hydrogen peroxide (0.005 mole) added. After stirring for 10 minutes at high speed, the reaction mixture was filtered through 25 g of Drierite ®. The filtrate titrated 0.015M in peroxide. With no volatile solvent loss and 100% yield, a peroxide concentration of 0.023M would have been expected.

This Example illustrates the advantage of efficient mixing of the water and organic phases.

EXAMPLE 5

Preparation of A(19)

A flask was loaded with 50 ml of 1,1,2-trichlorotrifluoroethane and 34 g of B(19) (0.01 mole). The mixture was cooled to −5° C and then 1.06 g of finely divided sodium carbonate (0.01 mole) and 0.135 ml of 90% hydrogen peroxide (0.005 mole) added. The mixture was stirred for 3.5 hours at −5° C. and then filtered through 50 g of Drierite ® into a polyethylene bottle. Peroxide content by titration was 0.034M. With no volatile solvent loss and 100% yield, a peroxide concentration of about 0.074M would have been expected.

EXAMPLE 6

Preparation of Peroxide from $CF_3O(CF_2O)_3CF_2COF$

A flask under nitrogen was loaded with 10 g of $CF_3O(CF_2O)_3CF_2COF$ (0.03 mole), 1.59 g of powdered sodium carbonate (0.015 mole), and 100 ml of 1,1,2-trichlorotrifluoroethane. The mixture was cooled to −5° C. and then 1.5 ml of 30% hydrogen peroxide (0.015 mole) added. The mixture was stirred for 3 hours at −5° C. and then filtered through 20 g of Drierite ® into a polyethylene bottle. Peroxide content by titration was 0.055M. With no volatile solvent loss and 100% yield, a peroxide concentration of about 0.14M would have been expected.

COMPARATIVE EXAMPLE 1

Preparation of A(7)

A volumetric flask loaded with 12.25 g of sodium hydroxide was brought to 100 ml with distilled water.

This solution (33 ml) was mixed with 100 ml of 1,1,2-trichlorotrifluoroethane and 5.2 ml of 30% hydrogen peroxide at −5° C. to −7° C. With rapid stirring, 148 g of B(7) was added over 2 minutes. A mild exotherm raised the reaction mixture to 5° C. to 10° C. This mixture was stirred for another five minutes at 0° C. The lower layer carrying a lot of emulsified water was separated with great difficulty. Shaking this layer with the usual aqueous sodium carbonate/bicarbonate wash gave a stiff gel. Freezing the gel and thawing, added hundreds of ml more of 1,1,2-trichlorotrifluoroethane, and forcing through Drierite ® gave a small quantity of 0.055M peroxide solution.

This Example illustrates the problems that excessive amounts of water cause.

EXAMPLE 7

Coating of Aluminum with Poly(tetrafluoroethylene)

A 0.12M solution of A(9) in 1,1,2-trichlorotrifluoroethane was washed down the 1.5×4″ rectangular face of a 16.18 g grit blasted aluminum coupon. The coupon was dried for 15 minutes under vacuum at room temperature. The coupon now weighed 16.26 g indicating A(9) pickup of 0.08 g. The coupon was loaded into a 400 ml stainless stell autoclave with 50 g of gaseous tetrafluoroethylene and heated at 60° C. for 4 hours. On recovery, the aluminum coupon weighed 17.47 g, the 1.21 g weight gain coming from a visually continuous plastic film of poly(tetrafluoroethylene) covering the grit blasted side of the coupon.

EXAMPLE 8

Coating of Kevlar ® Fibers with Poly(tetrafluoroethylene)

A slurry made from 4.29 g of Kevlar ® [poly(p-phenylterephthalamide)] fibrids, 5 ml of 0.09M A(8), and 80 ml of 1,1,2-trichlorotrifluoroethane was stripped to dryness, first using a rotary evaporator, and then a vacuum pump for fifteen minutes. These fibrids were loaded into a 400 ml autoclave with 50 g of gaseous tetrafluoroethylene. Heating for 3 hours at 60° C. gave 45.3 g of Kevlar ® fibrids coated with poly(tetrafluoroethylene).

EXAMPLE 9

Coating of Kevlar ® Pulp with Poly(tetrafluoroethylene/perfluoropropyl vinyl ether)

A slurry was prepared using 25 g of Kevlar ® pulp, 10 ml of 0.01M A(9), and 250 ml of 1,1,2-trichlorotrifluoroethane. This was stripped to dryness, first using a rotary evaporator, and then a vacuum pump for 30 minutes. The pulp was loaded into a 400 ml autoclave along with 50 g of gaseous tetrafluoroethylene and 3 g of gaseous perfluoropropyl vinyl ether. Standing for 24 hours at room temperature gave 51.3 g of pulp coated with copolymer.

EXAMPLE 10

Coating of Sailcloth with Poly(tetrafluoroethylene)

A 3.79 g sample of polyester sailcloth was mounted on a frame and rinsed with 1,1,2-trichlorotrifluoroethane to clean the surface. The sailcloth was then rinsed with 0.025M A(10) in 1,1,2-trichlorofluoroethane and drained. The sample was transferred to a 500 ml pressure vessel. The vessel was evacuated for 5 minutes to remove residual 1,1,2-trichlorotrifluoroethane and then pressured with 49 to 62 psi of tetrafluoroethylene gas.

After standing overnight at room temperature, the sample was recovered. The cloth now weighed 6.20 g and was covered with a shiny coating of poly(tetrafluoroethylene).

Although preferred embodiments of the invention have been described, it is understood that there is no intent to limit the invention to the precise embodiments described and it is further understood that the right is reserved to all changes and modifications which fall within the scope of the claims.

What is claimed is:

1. A poly(perfluoroether)acyl peroxide of the formula

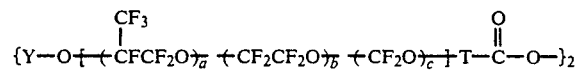

wherein

Y is a perfluoroalkyl group containing up to 12 carbon atoms,

$-(CF_2CF_2O)-$ and $-(CF_2O)-$ are repeat units where a+b+c is a minimum of 2 and a maximum such that the maximum molecular weight of the peroxide is about 33,000; and T is $-CF_2-$ and $-CF(CF_3)-$, provided that when a is zero, T is not $-CF(CF_3)-$, when b is zero T is not $-CF_2-$, and further provided that when a and b are zero, T is $-CF_2-$.

2. A process for the preparation of polymeric (perfluorether)acyl peroxide product comprising reaction of an acyl halide with a peroxide, under basic conditions, in the presence of a limited amount of water, wherein the water to peroxide molar ratio is controlled in the starting reaction mixture so that such ratio is from about 0.2 to about 10.

3. The process of claim 2 wherein the reaction mixture is passed through a solid desiccant to remove liquid water, at the conclusion of the reaction process.

4. The process of claim 3 wherein the desiccant is anhydrous calcium sulfate.

5. The process of claim 2 wherein the molar ratio of water to peroxide is from about 0.8 to about 6.

6. The process of claim 2 wherein the base is an alkali or alkaline earth (bi)carbonate or phosphate that is soluble in the reaction mixture.

7. The process of claim 2 carried out within a temperature range of −30° C. to 40° C.

8. The process of claim 7 carried out within a temperature range of −15° C. to 0° C.

9. The poly(perfluoroether)acyl peroxide of claim 1 wherein more than one type of monomer unit is enclosed within the bracketed term.

10. The poly(perfluoroether)acyl peroxide of claim 9 wherein the polymer is a block copolymer.

11. The poly(perfluoroether)acyl peroxide of claim 9 wherein the polymer is a random copolymer.

12. The poly(perfluoroether)acyl peroxide of claim 10 wherein "T" is a fragment of the last monomer used.

13. The peroxide of claim 1 wherein Y is $CF_3-$, a is zero, b is zero and the repeat unit is $-CF_2O-$.

14. The peroxide of claim 1 wherein Y is $CF_3CF_2-$, T is $-CF_2-$, a is zero, c is zero and the repeat unit is $-CF_2CF_2O-$.

15. The peroxide of claim 1 wherein Y is $CF_3CF_2CF_2-$, T is $-CF(CF_3)-$, b is zero, c is zero and the repeat unit is $-CF(CF_3)CF_2O-$.

16. The peroxide of claim 1 wherein the value of $a+b+c$ is a minimum of 2 and a maximum of such that the molecular weight of the peroxide does not exceed 16,500.

17. The peroxide of claim 16 wherein the value of $a+b+c$ is a minimum of 5 and a maximum such that the molecular weight of the peroxide does not exceed 11,000.

18. The peroxide of claim 17 wherein Y is $CF_3-$, a is zero, b is zero and the repeat unit is $-CF_2O-$.

19. The peroxide of claim 17 wherein Y is $CF_3CF_2-$, T is $-CF_2-$, a is zero, c is zero and the repeat unit is $-CF_2CF_2O-$.

20. The peroxide of claim 17 wherein Y is $CF_3CF_2CF_2-$, T is $-CF(CF_3)-$, b is zero, c is zero and the repeat unit is $-CF(CF_3)CF_2O-$.

* * * * *